US006814541B2

United States Patent
Evans et al.

(10) Patent No.: US 6,814,541 B2
(45) Date of Patent: Nov. 9, 2004

(54) JET AIRCRAFT FAN CASE CONTAINMENT DESIGN

(75) Inventors: Charles R. Evans, Cincinnati, OH (US); Douglas D. Ward, West Chester, OH (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 10/265,999

(22) Filed: Oct. 7, 2002

(65) Prior Publication Data

US 2004/0146393 A1 Jul. 29, 2004

(51) Int. Cl.$^7$ ............................................. F01D 21/00
(52) U.S. Cl. ................................ 415/200; 419/9
(58) Field of Search ..................... 415/9, 200, 173.4, 415/174.4, 222, 135, 173.5–7

(56) References Cited

U.S. PATENT DOCUMENTS

| | | | |
|---|---|---|---|
| 4,085,012 A | 4/1978 | Marceau et al. | |
| 4,127,451 A | 11/1978 | Marceau et al. | |
| 4,140,433 A | 2/1979 | Eckel | |
| 4,345,874 A | 8/1982 | Ozeki et al. | |
| 4,377,370 A | 3/1983 | Porcelli | |
| 4,534,698 A | 8/1985 | Tomich | |
| 4,547,122 A | 10/1985 | Leech | |
| 4,599,042 A | 7/1986 | Colliver | |
| 4,699,567 A | 10/1987 | Stewart | |
| 4,925,365 A | * 5/1990 | Crozet et al. | 415/173.6 |
| 5,151,311 A | * 9/1992 | Parente et al. | 428/116 |
| 5,160,248 A | 11/1992 | Clarke | |
| 5,259,724 A | 11/1993 | Liston et al. | |
| 5,344,280 A | 9/1994 | Langenbrunner et al. | |
| 5,403,148 A | 4/1995 | Forrester | |
| 5,408,826 A | 4/1995 | Stewart et al. | |
| 5,411,370 A | 5/1995 | Varsik | |
| 5,431,532 A | 7/1995 | Humke et al. | |
| 5,437,538 A | 8/1995 | Mitchell | |
| 5,447,411 A | 9/1995 | Curley et al. | |
| 5,454,690 A | 10/1995 | Wolfe et al. | |
| 5,482,429 A | 1/1996 | Penda | |
| 5,483,792 A | 1/1996 | Czachor et al. | |
| 5,516,257 A | 5/1996 | Kasprow et al. | |
| 5,516,258 A | 5/1996 | Newton | |
| 5,594,216 A | * 1/1997 | Yasukawa et al. | 181/213 |
| 5,627,222 A | * 5/1997 | Recker et al. | 523/400 |
| 5,662,457 A | * 9/1997 | Bechtel et al. | 415/135 |
| 5,690,469 A | 11/1997 | Deal et al. | |
| 5,765,993 A | 6/1998 | Weiss | |
| 5,945,356 A | * 8/1999 | Pott | 442/57 |
| 6,044,810 A | 4/2000 | Surridge | |
| 6,059,524 A | 5/2000 | Costa et al. | |
| 6,187,411 B1 | * 2/2001 | Palmer | 428/102 |
| 6,282,786 B1 | 9/2001 | Evans et al. | |
| 6,287,080 B1 | 9/2001 | Evans et al. | |
| 6,290,455 B1 | * 9/2001 | Hemmelgarn et al. | 415/9 |
| 6,450,450 B1 | * 9/2002 | MacDonald et al. | 244/126 |

* cited by examiner

*Primary Examiner*—Edward K. Look
*Assistant Examiner*—J. M. McAleenan
(74) *Attorney, Agent, or Firm*—Lonathan P. Miller; Carmen Santa Maria; McNees Wallace & Nurick LLC

(57) ABSTRACT

A jet aircraft fan case containment design that uses polyurethane to absorb fan blade fragments and uses polyurethane to prevent fan blade fragments from penetrating the fan case. The polyurethane is used in place of or to supplement KEVLAR® and/or fiberglass wraps used to contain fan blade fragments. The polyurethane is also used in place of aluminum alloy and stiffening ribs in the fan case.

21 Claims, 2 Drawing Sheets

JET AIRCRAFT FAN CASE CONTAINMENT DESIGN

FIELD OF THE INVENTION

The present invention is directed to an improved jet aircraft fan case containment system.

BACKGROUND OF THE INVENTION

Modern aircraft are often powered by a propulsion system that includes a gas turbine engine housed within an aerodynamic streamlined nacelle. The major engine components include a fan section comprising a rotatable hub, an array of fan blades projecting radially from the hub and a fan casing encircling the blade array of fan blades. One of the functions of the fan casing is to contain or capture a blade, or a blade fragment, if it should become separated from the hub.

For small diameter engines, adequate containment capability is generally achieved with a metallic case thick enough to resist penetration by blade fragments. For large diameter engines, a metallic case thick enough to resist penetration is prohibitively heavy as the size of potential projectiles in the form of blades or blade fragments become larger. Therefore, it is customary for manufacturers of large diameter engines to employ a fabric wrapped containment system comprising a light weight, high strength ballistic fabric such as fabric composed of aromatic polyamide fiber of extremely high tensile strength and greater resistance of elongation than steel wrapped in multiple layers around a relatively thin, penetration susceptible support case. Such aromatic polyamide fiber has a high energy-absorption property, which makes it useful for containing projectiles, such as aircraft engine fan blades or blade fragments. One well-known type of aromatic polyamide fiber is KEVLAR® (a trademark of E.I. DuPont de Nemours & Company). In operation, a separated blade or blade fragment penetrates the support case and strikes the fabric. The fabric deflects radially, however at least some of the fabric layers remain intact to capture and contain the fragment. The casings for such engines are large, requiring a significant quantity of expensive KEVLAR®.

The customary construction of smaller diameter engines employs stiffening ribs annularly around the exterior wall of the fan case. In operation, a separated blade fragment will not penetrate the casing and will be contained within the casing boundaries. However, the use of aluminum alloy as the sole component of the fan casing results in a casing that is rather heavy.

Such containment systems add considerable weight to both types of engines. Therefore it is desirable to utilize materials that reduce the weight of the case without reducing the strength of the case, and that replace expensive KEVLAR® with less expensive material.

SUMMARY OF THE INVENTION

Recent improvements in polyurethane technology have improved polyurethane's ability to withstand temperatures over 250° F. without a decrease in mechanical properties. Additionally, polyurethane has a very high strain to failure ratio at 400%. There are some benefits as to the weight of a certain volume of polyurethane when compared to aluminum or steel, since polyurethane is 55% lighter than aluminum and 80% lighter than steel. Thus, a preselected thickness of polyurethane can provide the same energy-absorbing capabilities as these metals at a significant reduction in weight.

Briefly stated, one embodiment of the present invention provides a fan casing which includes a penetrable first covering wrapped around an impact zone of a support case, a second support covering also wrapped around the impact zone of the support case, a third support covering wrapped around the support case but axially offset from the impact zone, and a fourth penetration-resistant containment covering wrapped around both the first penetrable covering and the second and third support coverings The fourth penetration-resistant containment covering includes at least a polyurethane portion and has high energy absorbing capabilities. The polyurethane can be wrapped with KEVLAR®. However, because of the energy-absorbing capabilities of the polyurethane, the amount of KEVLAR® required to provide containment can be reduced. In the event that a high energy blade fragment ruptures the support case, the penetrable covering and the second and third support coverings, the penetration-resistant covering intercepts the deformed fragment, confining it to a predetermined radial envelope. The relatively high ability of polyurethane to absorb energy in comparison to a similar weight of aluminum or steel decreases the magnitude of the stress that is transmitted along the fan case. In all situations, the fan case of a jet engine must be designed to be able to contain an engine fan blade in the event of a blade-out failure. The use of polyurethane as a component of the fan case will also result in a reduction in the overall weight of the fan cases, as a lighter material can be used to provide the required containment capability for the fan case.

A second embodiment of the present invention provides a metal case with a reduced wall thickness, with a layer of polyurethane cast on the outer surface of the metal case. The layer or layers of KEVLAR® may optionally be wrapped over the cast polyurethane.

In all embodiments, the casing walls located adjacent to the blade tips are subjected to internal pressure pulses traveling with the rotating blades. In addition, low integral order rotor per revolution and bearing passing frequency excitations are transmitted to the casing through casing joints within the frames. The addition of polyurethane to the fan case improves damping capability, thereby improving the vibrational characteristics of the case. One advantage of the present invention is a reduction in the weight of the fan case containment structure, without a reduction in the ability of the fan casing containment structure to contain or capture fan blades or blade fragments. Such a reduction in weight will increase the fuel efficiency of engines that utilize fan blade containment structures.

Another advantage of the present invention is a reduction in the forces that are transmitted through the fan case containment structure, which reduces the overall fatigue of the structure since the overall stress and strain on the component parts is reduced. Such a reduction in the transmitted forces will allow the engine to be operated for longer periods of time without requiring repairs.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
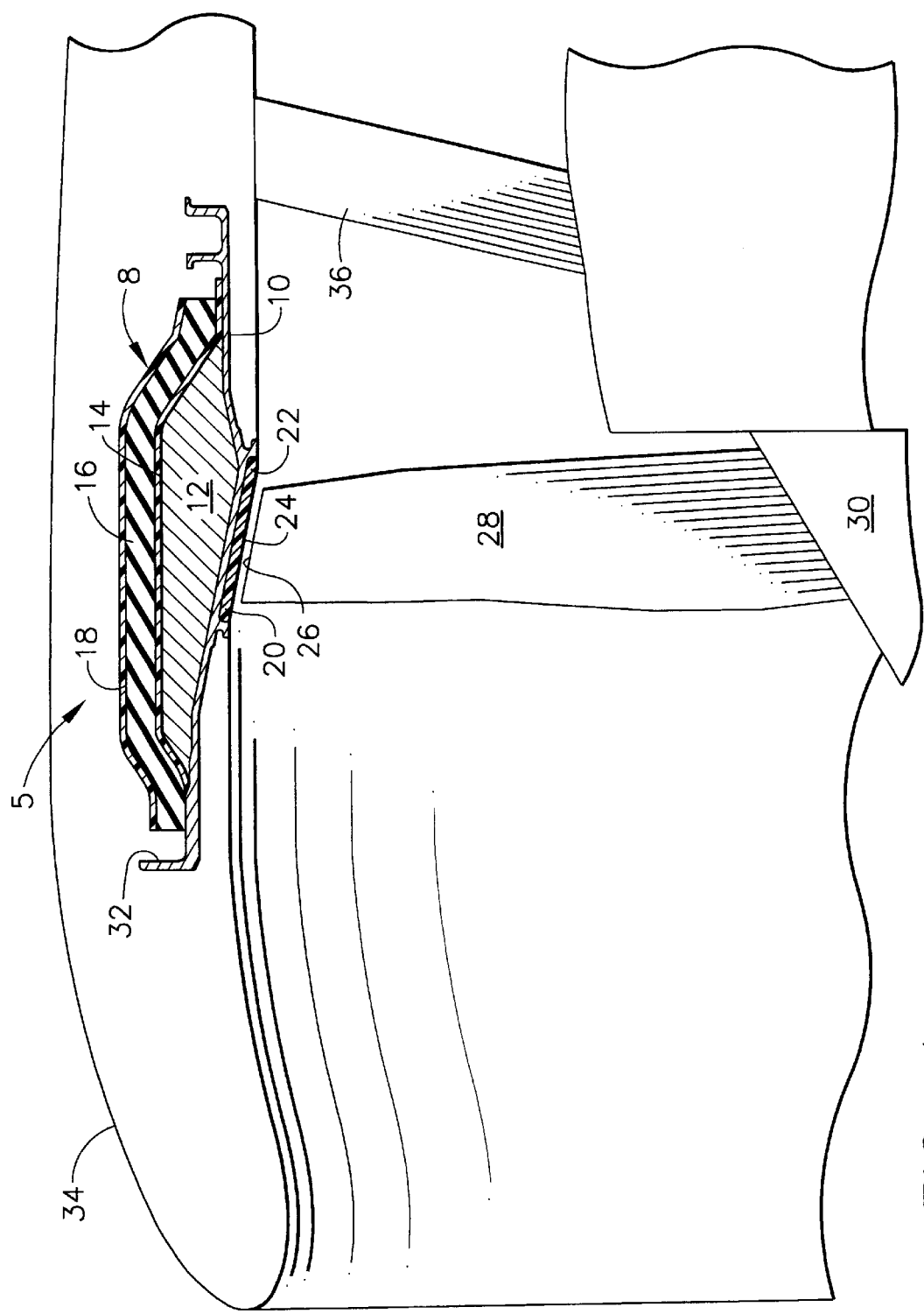
FIG. 1 is a side view, in partial cross-section, of a forward portion of a fan jet engine including a fan casing according to one embodiment of the present invention.

Referring now to FIG. 1 there is shown an exemplary portion 5 of a fan jet engine employing an embodiment of the present invention. As is conventional, only so much of the engine is shown as is required for an understanding of the present invention. As is conventional, bypass fan jet engine portion 5 includes a annular blade containment structure 10 which surrounds the rotating fan blades 28.

Other conventional elements such as compressor section, combustion section, turbine section and exhaust section (not shown) are included in a conventional engine. Since these are conventional elements well known to those skilled in the art, but are not otherwise relevant to the understanding of the present invention, further illustration and description thereof is omitted.

The invention is described below in terms of Low Bypass Fan Engines and High-Bypass Fan Engines. However, its use in not so restricted and it can be used for blade containment on High Bypass Fan Engines, such as the GE-90 and Ultra-High Bypass Fan Engines.

The fan includes a plurality of radially-oriented circumferentially spaced fan blades 28 which typically are made of a high-strength, low weight material such as a titanium alloy of pre-selected length, for example, twelve to fourteen inches long. Each such blade may weigh on the order of 2 to 3 pounds and, when rotating at its designed speed, may have a kinetic energy of about 30,000 foot pounds. An annular blade containment structure 10 according to one embodiment of the present invention is disposed immediately surrounding the path of blades 28 and is effective for receiving blade fragments which may be accidentally released. The containment structure 10 retains the blade or blade fragments without permitting them to become free projectiles exterior to the fan jet engine.

In High Bypass Fan Engines, although the fan blades are manufactured of lightweight composite materials, they can reach diameters of 10 ft. or greater. Thus, the overall weight and energies achieved at operating speeds is at least as high as discussed above. Furthermore, the fan cowl and surrounding structure is exceedingly large, making the use of large amounts of lightweight material a necessity. By reducing the amount of lightweight material such as KEVLAR® by substituting polyurethane, without reducing the energy absorbing capability of the containment structure, considerable cost savings can be achieved.

There is shown in FIG. 1 fan casing 12 including containment structure 30 and the elements therein. Containment structure 30 is attached to the engine 10 at an aft flange 32 of the fan casing 12 and is effective for supporting forward portions of the engine 10, such as the inlet cowl 34.

A polyurethane containment blanket 16, which may include, for example, a plurality of plies or layers of KEVLAR® fabric, combined with polyurethane, which is cured in situ, is overlaid on outer wall 14. Recent improvements in polyurethane technology have improved the ability of polyurethane to withstand higher temperatures, such as those temperatures found around the fan blades of jet aircraft engines in the fan casings.

Containment blanket 16 is secured in position by any suitable means such as, for example, by clamping the edges thereof by conventional means (not shown). Alternatively, containment blanket 16 may be retained in its operative position by an outer protective shell 18 with the outward forces of any blade fragments being absorbed and distributed around the circumference of containment structure by containment blanket 16.

A shallow depression 20 in inner wall 10 contains an rub strip 24 against which blade tips 26 of the blades 28 are closely fitted for providing a sealing area 24 for reducing the amount of air leaking over the tips 26. Rub strip 24, is an abradable shroud material which may be easily and smoothly worn away by tip 26 of blade 28 during initial run so that as tight a tip seal as possible is obtained. Since this material and the technique for its use is conventional, therefore, it will not be further detailed herein.

Inner wall 10 may be of any suitable material, such as aluminum alloy. A honeycomb material 12 is placed over the surface of inner wall 10. The honeycomb 12 may be, for example, aluminum. Outer wall 14 may also be of any suitable material such as, for example, graphite, aluminum alloy or fiber material in an epoxy resin matrix. Since these materials and the technique for their use is conventional, it will not be further detailed herein.

Finally, an outer protective shield 18 may also be of any convenient material such as aluminum or a fiber/resin matrix, however, in the preferred embodiment, for additional containment and protection, protective shield 18 is a KEVLAR® fabric in an epoxy matrix. Since this material and the technique for its use is conventional, it will not be further detailed herein.

In operation, if one or more fragments from blades 28 are freed, they create puncture holes in inner wall 10 and outer wall 14, but are contained by outer protective shield 18. However, the loss of one or more blades 28 may provide such a severe imbalance that remaining blades 28 move in an increased orbit about the original axis of shaft 30 thereby penetrating rub strip 22 and passing through shallow depression 20 and inner wall 10 into honeycomb region 12. Honeycomb region 12 is made deep enough so that the maximum radially outward excursion of tips 26 of blades 28 do not reach outer wall 14. Since this material and the technique for its use is conventional, it will not be further detailed herein.

The invention is advantageous in that it reliably contains a high energy fan blade fragment without adding excessively to engine weight by using polyurethane resin. The invention also limits deflection of the containment fabric to minimize the risk of damage to the rest of the engine and engine casing. The invention also has a dampening effect on the fan case, which improves the vibrational characteristics of the case.

A number of different embodiments for the composition and configuration of containment blanket 16 exist. In all of the embodiments, the surface of the aluminum case where the polyurethane resin is to be attached is first treated with a phosphoric acid anodized ("PAA") etch treatment prior to the application of the polyurethane. The PAA etch treatment is known to the art as an aluminum pretreatment for the purpose of preparing the surface of the aluminum to receive a coating of primer. A description of the PAA etch treatment is set forth in U.S. Pat. Nos. 4,085,012 and 4,127,451, which are herein incorporated by reference. The surface of the fan casing is coated to a preselected thickness with a standard non-chromated spray primer to achieve a preselected cured primer thickness. If a chromated primer is used, a weaker bond will be formed between the surface of the fan casing and the primer and a weaker bond will be formed between the polyurethane resin and the surface of the fan casing. The amount of primer coat thickness applied to the fan casing preferably is sufficient to obtain a cured thickness between about 0.00002 and about 0.00200 inches. In a preferred embodiment, the primer is TY-PLY BN®, a proprietary non-chromated primer available from Lord Corporation of Erie, Pa.

Once the primer has been applied to the fan casing, the primer is cured in two stages at pre-selected temperatures and for pre-selected periods of time. In all of the embodiments, the polyurethane resin has a composition as set forth in U.S. Pat. No. 6,287,080, which is herein incorporated by reference, and is applied using an injection molding technique, which is set forth in U.S. Pat. Nos. 6,287,080 and 6,282,786, also incorporated by reference herein. The resin is then cured using a technique which is well known to one in the art which are referred to in the prior referenced U.S. patents. In all embodiments, the final thickness of containment blanket 16 is in the range of about 0.05 inches to about 2 inches.

EXAMPLE 1

Projectile shield 18 comprises one layer of polyurethane. First, a layer of TY-PLY BN® primer is applied to outer wall 14 and cured. A polyurethane mold is then placed around outer wall 14. A layer of polyurethane is then injected into the mold and cured around the surface of outer wall 14. The polyurethane mold is then removed from the cured layer of polyurethane.

EXAMPLE 2

Projectile shield 18 comprises one layer of KEVLAR® fabric and one layer of polyurethane. First, a layer of TY-PLY BN® primer is applied to outer wall 14 and cured. A layer of KEVLAR® fabric is then wrapped around outer wall 14 and around the layer of TY-PLY BN® primer. Once the layer of KEVLAR® fabric is in place, a polyurethane mold is placed around the layer of KEVLAR® fabric. A layer of polyurethane is then injected into the mold around the layer of KEVLAR® fabric, the polyurethane layer encapsulating and holding the KEVLAR® fabric in place. The polyurethane is then cured. The polyurethane mold is then removed from the cured layer of polyurethane.

EXAMPLE 3

Projectile shield 18 comprises one layer of KEVLAR® fabric and one layer of polyurethane. First, a layer of TY-PLY BN® primer is applied to outer wall 14 and cured. Once the layer of TY-PLY BN® primer is cured, a polyurethane mold is placed around outer wall 14. A layer of polyurethane is then molded around the outer wall 14, and cured. The polyurethane mold is then removed from around the outer wall 14. Once the polyurethane mold is removed, a layer of KEVLAR® fabric is wrapped around the cured polyurethane, the layer of KEVLAR® fabric covering the entire layer of polyurethane. The KEVLAR® fabric is held in place mechanically as is conventional.

EXAMPLE 4

Projectile shield 18 comprises one layer of KEVLAR® fabric and two layers of polyurethane. First, a layer of TY-PLY BN® primer is applied to outer wall 14 and cured. A first polyurethane mold is placed around outer wall 14. A first layer of polyurethane is then injected into the first polyurethane mold and cured. The first polyurethane mold is then removed from around the outer wall 14. A layer of KEVLAR® fabric is then placed around the cured polyurethane, the layer of KEVLAR® fabric covering the entire first layer of polyurethane. A second polyurethane mold is then placed around the layer of KEVLAR® fabric. A second layer of polyurethane is then injected into the second polyurethane mold around the KEVLAR® fabric layer and cured. The second polyurethane mold is then removed from the layer of KEVLAR® fabric.

EXAMPLE 5

Projectile shield 17 comprises one layer of KEVLAR® fabric, two layers of epoxy film, and two layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. The first polyurethane mold is then removed from around outer wall 14. A first layer of epoxy film is then placed around the first layer of cured polyurethane. A layer of KEVLAR® fabric is then placed directly onto the first layer of epoxy film, the layer of KEVLAR® fabric covering the entire first layer of polyurethane, the first layer of epoxy film binding the layer of KEVLAR® fabric to the first layer of polyurethane. A second layer of epoxy film is then placed on the surface of the layer of KEVLAR® fabric. A second polyurethane mold is then placed around the layer of KEVLAR® fabric. A second layer of polyurethane is then molded around the layer of KEVLAR® fabric and cured, the second layer of epoxy film binding the KEVLAR® to the second layer of polyurethane. The second polyurethane mold is then removed from around the layer of KEVLAR® fabric.

EXAMPLE 6

Projectile shield 17 comprises two layers of KEVLAR® fabric and three layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. The first polyurethane mold is then removed from around outer wall 14. A first layer of KEVLAR® fabric is then placed around the first layer of polyurethane, the first layer of KEVLAR® fabric covering the first layer of polyurethane. A second polyurethane mold is then placed around the first layer of KEVLAR® fabric. A second layer of polyurethane is then injected into the second polyurethane mold and cured. The second polyurethane mold is then removed from around the first layer of KEVLAR® fabric. A second layer of KEVLAR® fabric is then placed around the second layer of polyurethane, the second layer of KEVLAR® fabric covering the second layer of polyurethane. A third polyurethane mold is then placed around the second layer of KEVLAR® fabric. A third layer of polyurethane is then injected into the third polyurethane mold and cured. The third polyurethane mold is then removed from around the second layer of KEVLAR® fabric

EXAMPLE 7

Projectile shield 17 comprises two layers of KEVLAR® fabric, four layers of epoxy film, and three layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. A first layer of epoxy film is then placed around the first layer of cured polyurethane. A first layer of KEVLAR® fabric is then placed directly onto the first layer of epoxy film, the first layer of KEVLAR® fabric covering the entire first layer of polyurethane, the first layer of epoxy film binding the layer of KEVLAR® fabric to the first layer of polyurethane. A second layer of epoxy film is then placed on the surface of the first layer of KEVLAR® fabric. A second polyurethane mold is then placed around the first layer of KEVLAR® fabric. A second layer of polyurethane is then injected into the second polyurethane mold and cured, the second layer of epoxy film binding the second layer of polyurethane to the first layer of KEVLAR® fabric. The second polyurethane mold is then removed from around the first layer of KEVLAR® fabric. A third layer of epoxy film is then placed around the second layer of cured polyurethane. A second layer of KEVLAR® fabric is then placed directly onto the third layer of epoxy film, the second layer of KEVLAR® fabric covering the entire second layer of polyurethane, the third layer of epoxy film binding the second layer of KEVLAR® fabric to the second layer of polyurethane. A fourth layer of epoxy film is then placed on the surface of the second layer of KEVLAR® fabric. A third polyurethane mold is then placed around the second layer of KEVLAR® fabric. A third layer of polyurethane is then injected into the second polyurethane mold and cured, the fourth layer of epoxy film binding the third layer of polyurethane to the second layer of KEVLAR® fabric. The third polyurethane mold is then removed from around the second layer of KEVLAR® fabric.

EXAMPLE 8

Projectile shield 17 comprises one layer of fiberglass and one layer of polyurethane. First, a layer of TY-PLY BN® primer is applied to outer wall 14 and cured. Once the layer of TY-PLY BN® is cured, a polyurethane mold is placed around outer wall 14. A layer of polyurethane is then molded around the outer wall 14, and cured. The polyurethane mold is then removed from around the outer wall 14. Once the polyurethane mold is removed, a layer of fiberglass is wrapped around the cured polyurethane, the layer of fiberglass covering the entire outer wall 14. The fiberglass is held in place mechanically as is conventional.

EXAMPLE 9

In Example 9, containment blanket 16 comprises one fiberglass blanket and one layer of polyurethane resin. First, a layer of TY-PLY BN® primer is applied to outer wall 14 and cured. A layer of fiberglass is then wrapped around outer wall 14 and around the layer of TY-PLY BN® primer. Once the layer of fiberglass is in place, a polyurethane mold is placed around the layer of fiberglass. A layer of polyurethane is then injected into the mold around the layer of fiberglass, the polyurethane layer encapsulating and holding the fiberglass in place. The polyurethane is then cured. The polyurethane mold is then removed from the cured layer of polyurethane.

EXAMPLE 10

In Example 10, containment blanket 16 comprises one layer of fiberglass and two layers of polyurethane. First, a layer of TY-PLY BN® primer is applied to outer wall 14 and cured. A first polyurethane mold is placed around outer wall 14. A first layer of polyurethane is then injected into the first polyurethane mold and cured. The polyurethane mold is then removed from around the outer wall 14. A layer of fiberglass is then placed around the cured polyurethane, the layer of fiberglass covering the entire first layer of polyurethane. A second polyurethane mold is then placed around the layer of fiberglass. A second layer of polyurethane is then injected into the second polyurethane mold around the fiberglass layer and cured. The second polyurethane mold is then removed from the layer of fiberglass.

EXAMPLE 11

In Example 11, containment blanket 16 comprises one layer of fiberglass, two layers of epoxy film, and two layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. The first polyurethane mold is then removed from around outer wall 14. A first layer of epoxy film is then placed around the first layer of cured polyurethane. A layer of fiberglass is then placed directly onto the first layer of epoxy film, the layer of fiberglass covering the entire first layer of polyurethane, the first layer of epoxy film binding the layer of fiberglass to the first layer of polyurethane. A second layer of epoxy film is then placed on the surface of the layer of fiberglass. A second polyurethane mold is then placed around the layer of fiberglass. A second layer of polyurethane is then molded around the layer of fiberglass and cured, the second layer of epoxy film binding the second layer of polyurethane to the layer of fiberglass. The second polyurethane mold is then removed from around the layer of fiberglass.

EXAMPLE 12

In Example 12, containment blanket 16 comprises two layers of fiberglass and three layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. The first polyurethane mold is then removed from around outer wall 14. A first layer of fiberglass is then placed around the first layer of polyurethane, the first layer of fiberglass covering the first layer of polyurethane. A second polyurethane mold is then placed around the first layer of fiberglass. A second layer of polyurethane is then injected into the second polyurethane mold and cured. The second polyurethane mold is then removed from around the first layer of fiberglass. A second layer of fiberglass is then placed around the second layer of polyurethane, the second layer of fiberglass covering the second layer of polyurethane. A third polyurethane mold is then placed around the second layer of fiberglass. A third layer of polyurethane is then injected into the third polyurethane mold and cured. The third polyurethane mold is then removed from around the second layer of fiberglass.

EXAMPLE 13

In Example 13, containment blanket 16 comprises two layer of fiberglass, four layers of epoxy film, and three layers of polyurethane. First, a layer of TY-PLY BN® primer is applied to outer wall 14 and cured. A first polyurethane mold is then placed around outer wall 14. A first layer of polyurethane is then injected into the first polyurethane mold and cured. A first layer of epoxy film is then placed around the first layer of cured polyurethane. A first layer of fiberglass is then placed directly onto the first layer of epoxy film, the first layer of fiberglass covering the entire first layer of polyurethane, the first layer of epoxy film binding the layer of fiberglass to the first layer of polyurethane. A second layer of epoxy film is then placed on the surface of the first layer of fiberglass. A second polyurethane mold is then placed around the first layer of fiberglass. A second layer of polyurethane is then injected into the second polyurethane mold and cured, the second layer of epoxy film binding the second layer of polyurethane to the first layer of fiberglass. The second polyurethane mold is then removed from around the first layer of fiberglass. A third layer of epoxy film is then placed around the second layer of cured polyurethane. A second layer of fiberglass is then placed directly onto the third layer of epoxy film, the second layer of fiberglass covering the entire second layer of polyurethane, the third layer of epoxy film binding the second layer of fiberglass to the second layer of polyurethane. A fourth layer of epoxy film is then placed on the surface of the second layer of fiberglass. A third polyurethane mold is then placed around the second layer of fiberglass. A third layer of polyurethane is then injected into the second polyurethane mold and cured, the fourth layer of epoxy film binding the third layer of polyurethane to the second layer of fiberglass. The third polyurethane mold is then removed from around the second layer of fiberglass.

Figure 2:
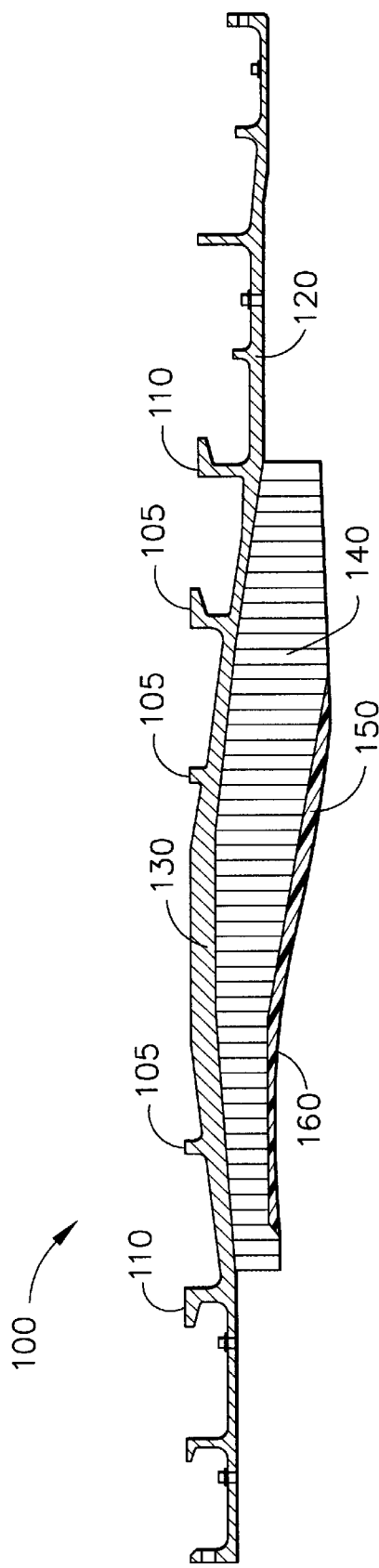
FIG. 2 is a second side view, in partial cross-section, of a forward portion of a second fan jet engine including a fan casing structure known to the art.

Referring now to FIG. 2 there is shown a cross-section of an exemplary fan jet engine casing 100 known in the art. The outer portion of the fan jet casing 120 comprises an aluminum alloy. The portion of the fan jet casing that extends annularly around the fan blade region 130, is thicker than the other portion of the fan casing to provide energy absorbing capability. Since fan blade fragments are more likely to impact this region of the fan casing, this region 130 must be thicker in order to prevent any fan blade fragments from penetrating the fan casing. As is conventional, the fan jet casing 120 includes stiffening ribs 105 and 110 which surrounds a fan (not shown). The fan jet casing 100 also includes an annular honeycomb region 140 that absorbs some of the energy of any blade fragments that impact the honeycomb region. A shallow depression in the honeycomb region contains an rub strip 150 against which blade tips (not shown), are closely fitted for providing a sealing area 160 for reducing the amount of air leaking over the tips (not shown). Rub strip 150, is an abradable shroud material which may be easily and smoothly worn away by the tip of the blades (not shown) during the initial run so that as tight a tip seal as possible is obtained. Since this material and the technique for its use is conventional, it will not be further detailed herein.

Figure 3:
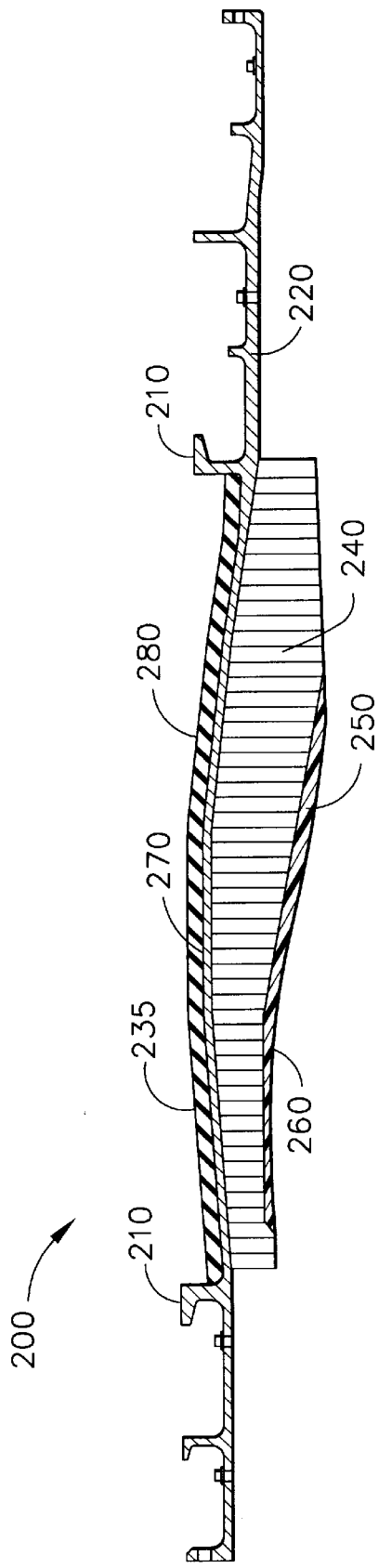
FIG. 3 is a third side view, in partial cross-section, of a forward portion of a third fan jet engine including a fan casing structure according to a second embodiment of the present invention.

Referring now to FIG. 3 there is shown an exemplary fan jet engine 200 employing an embodiment of the present invention. The outer portion of the fan jet casing 220 comprises an aluminum alloy. Since fan blade fragments are more likely to impact this region of the fan casing, this region must have sufficient energy absorbing ability to prevent any fan blade fragments from penetrating the fan casing. In this embodiment of the present invention, the additional energy absorbing material required to prevent fan blade fragments from penetrating is achieved through the use of a polyurethane layer 280 and/or the use of a woven fabric reinforcement such as KEVLAR® fabric or fiberglass. The polyurethane layer 280 has a thickness from about 10 mils to about 100 mils instead of aluminum alloy. The fan jet casing also includes a typical annular honeycomb region 280 that absorbs some of the energy of any blade fragments that impact the honeycomb region. The fan jet casing also includes stiffening ribs 210 which surrounds a fan (not shown). However, rather than being used to stiffen the area directly over the fan blades, the ribs 210 only appear at the edges of the region directly over the honeycomb region 240 with ribs such as 105 being eliminated, since the polyurethane layer 280 provides sufficient strength and stiffening to the outer portion of the case 200. A shallow depression in the honeycomb region contains an rub strip 250 against which blade tips (not shown), are closely fitted for providing a sealing area 260 for reducing the amount of air leaking over the tips (not shown). Rub strip 250, is an abradable shroud material as is well-known in the art which may be easily and smoothly worn away by the tip of the blades (not shown) during the initial run so that as tight a tip seal as possible is obtained. Since this material and the technique for its use is conventional, it will not be further detailed herein.

The surface of the aluminum alloy portion of the fan casing 235 where the polyurethane resin is to be attached is first treated with a PAA etch treatment prior to the application of the polyurethane resin. The surface of the fan casing is coated with a spray primer to achieve a preselected cured primer thickness. The amount of primer coat 270 thickness applied to the fan casing preferably is sufficient to obtain a cured thickness between about 0.00002 and about 0.00020 inches. In a preferred embodiment, the primer is TY-PLY BN®, a proprietary non-chromated primer available from Lord Corporation of Erie, Pa.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A blade containment structure surrounding a fan in a fan jet engine comprising:
    a honeycomb structure spaced radially outwardly from and surrounding tips of rotating blades of said fan, said honeycomb structure having an outer wall;
    a polyurethane projectile shield surrounding the outer wall of said honeycomb structure; and
    said polyurethane projectile shield having sufficient energy absorbing capability to contain blades and fragments of said blades thrown outward by damage to said fan.

2. A blade containment structure surrounding a fan in a fan jet engine comprising:
    a honeycomb structure spaced radially outwardly from and surrounding tips of rotating blades of said fan, said honeycomb structure having an outer wall;
    a polyurethane and fabric projectile shield surrounding the outer wall of said honeycomb structure; and
    said polyurethane projectile shield having sufficient energy absorbing capability to contain blades and fragments of said blades thrown outward by damage to said fan.

3. The blade containment structure of claim 2, wherein the fabric comprises a material selected from the group consisting of KEVLAR® fabric and fiberglass and combinations thereof.

4. The blade containment structure of claim 3, wherein the fabric comprises a plurality of layers of KEVLAR® fabric.

5. The blade containment structure of claim 3, wherein the fabric comprises a plurality of layers of fiberglass.

6. The blade containment structure of claim 3, wherein the projectile shield comprises a plurality of layers of polyurethane, wherein each layer of the plurality of layers of polyurethane is positioned adjacent to a layer of fabric.

7. The blade containment structure of claim 3, wherein the projectile shield comprises a plurality of layers of polyurethane alternating with a plurality of layers of KEVLAR® fabric.

8. The blade containment structure of claim 3, wherein the projectile shield comprises a plurality of layers of polyurethane alternating with a plurality of layers of fiberglass.

9. The blade containment structure of claim 3, wherein the fabric and polyurethane projectile shield comprises a layer of polyurethane and one layer of KEVLAR® fabric, wherein the layer of KEVLAR® fabric is encapsulated within the layer of polyurethane.

10. The blade containment structure of claim 3, wherein the fabric and polyurethane projectile shield comprises a layer of polyurethane and a layer of KEVLAR® fabric, the layer of KEVLAR® surrounding the layer of polyurethane.

11. The blade containment structure of claim 3, wherein the fabric and polyurethane projectile shield comprises two layers of polyurethane and an intermediate layer of KEVLAR® fabric.

12. The blade containment structure of claim 3, wherein the fabric and polyurethane projectile shield comprises a first layer of polyurethane surrounding the outer wall of the honeycomb structure, a first layer of epoxy film surrounding the first layer of polyurethane, a layer of KEVLAR® fabric surrounding the first layer of epoxy film, said KEVLAR® fabric being sealed to the first layer of polyurethane by the first layer of epoxy film, a second layer of epoxy film surrounding the layer of KEVLAR® fabric, and a second layer of polyurethane surrounding the layer of KEVLAR® fabric, said second layer of polyurethane being sealed to the layer of KEVLAR® fabric by the second layer of epoxy film.

13. The blade containment structure of claim 3, wherein the fabric and polyurethane projectile shield comprises a first layer of polyurethane surrounding the outer wall of honeycomb structure, a first layer of KEVLAR® fabric surrounding the first layer the polyurethane, a second layer of polyurethane surrounding the first layer of KEVLAR® fabric, a second layer of KEVLAR® fabric surrounding the second layer of polyurethane, and a third layer of polyurethane surrounding the second layer of KEVLAR® fabric.

14. The blade containment structure of claim 3, wherein the fabric and polyurethane projectile shield comprises a first layer of polyurethane surrounding the outer wall of the honeycomb structure, a first layer of epoxy film surrounding the first layer of polyurethane, a first layer of KEVLAR® fabric surrounding the first layer the epoxy film, said first layer of KEVLAR® fabric being sealed to the first layer of polyurethane by the first layer of epoxy film, a second layer of epoxy film surrounding the first layer of KEVLAR® fabric, a second layer of polyurethane surrounding the first layer of KEVLAR® fabric, said second layer of polyurethane being sealed to the first layer of KEVLAR® fabric by the second layer of epoxy film, a third layer of epoxy film surrounding the second layer of polyurethane, a second layer of KEVLAR® fabric surrounding the third layer of epoxy film, said second layer of KEVLAR® fabric being sealed to the second layer of polyurethane by the third layer of epoxy film, a fourth layer of epoxy film surrounding the second layer of KEVLAR® fabric, and a third layer of polyurethane surrounding the second layer of KEVLAR® fabric, said third layer of polyurethane being sealed to the second layer of KEVLAR® fabric by the fourth layer of epoxy film.

15. The blade containment structure of claim 3, wherein the fabric and polyurethane projectile shield comprises a layer of polyurethane and a layer of fiberglass, wherein the layer of fiberglass is encapsulated within the layer of polyurethane.

16. The blade containment structure of claim 3, wherein the fabric and polyurethane projectile shield comprises a layer of polyurethane and a layer of fiberglass, the layer of fiberglass surrounding the layer of polyurethane.

17. The blade containment structure of claim 3, wherein the fabric and polyurethane projectile shield comprises two layers of polyurethane and an intermediate layer of fiberglass.

18. The blade containment structure of claim 3, wherein the fabric and polyurethane projectile shield comprises a first layer of polyurethane surrounding the outer wall of the honeycomb structure, a first layer of epoxy film surrounding the first layer of polyurethane, a layer of fiberglass surrounding the first layer of epoxy film, said layer of fiberglass being sealed to the first layer of polyurethane by the first layer of epoxy film, a second layer of epoxy film surrounding the layer of fiberglass, and a second layer of polyurethane surrounding the layer of fiberglass, said second layer of polyurethane being sealed to the layer of fiberglass by the second layer of epoxy film.

19. The blade containment structure of claim 3, wherein the fabric and polyurethane projectile shield comprises a first layer of polyurethane surrounding the outer wall of the honeycomb structure, a first layer of fiberglass surrounding the first layer the polyurethane, a second layer of polyurethane surrounding the first layer of fiberglass, a second layer of fiberglass surrounding the second layer of polyurethane, and a third layer of polyurethane surrounding the second layer of fiberglass.

20. A blade containment structure surrounding a fan in a fan jet engine comprising:

a fan casing surrounding the fan, said fan casing having an inner wall and an outer wall;

a honeycomb structure spaced radially outwardly from and surrounding tips of blades of said fan;

said honeycomb structure being located on the inner wall of the fan casing;

a polyurethane projectile shield surrounding said honeycomb structure;

said polyurethane projectile shield being located on the outer wall of the fan casing opposite the honeycomb structure and having an outer and an inner surface, said inner surface being affixed to the outer wall of the fan casing; and said polyurethane projectile shield having sufficient energy absorbing capability to prevent blades and fragments of said blades from penetrating the outer surface of the polyurethane projectile shield.

21. A method for manufacturing a polyurethane blade containment structure comprising the steps of:

providing a fan jet engine containing a fan, said engine having a honeycomb structure, said honeycomb structure having an outer wall and being spaced radially outwardly from and surrounding the entire tips of blades of said fan;

applying a layer of primer to the outer wall of the honeycomb structure;

curing the layer of primer;

placing a polyurethane mold around the outer wall and layer of primer;

injecting a layer of polyurethane into the polyurethane mold;

curing the layer of polyurethane; and removing the polyurethane mold.

* * * * *

UNITED STATES PATENT AND TRADEMARK OFFICE
CERTIFICATE OF CORRECTION

PATENT NO. : 6,814,541 B2  Page 1 of 1
APPLICATION NO. : 10/265999
DATED : November 9, 2004
INVENTOR(S) : Charles R. Evans and Douglas D. Ward It is certified that error appears in the above-identified patent and that said Letters Patent is hereby corrected as shown below:

On the Title Page, Item (74) under Attorney, Agent, or Firm, "Lonathan" should be --Jonathan--

Signed and Sealed this

Fourth Day of March, 2008

JON W. DUDAS
*Director of the United States Patent and Trademark Office*